July 7, 1931.  E. WEISKER  1,813,690
PHOTOGRAPHIC APPARATUS
Filed Oct. 6, 1927  2 Sheets-Sheet 1
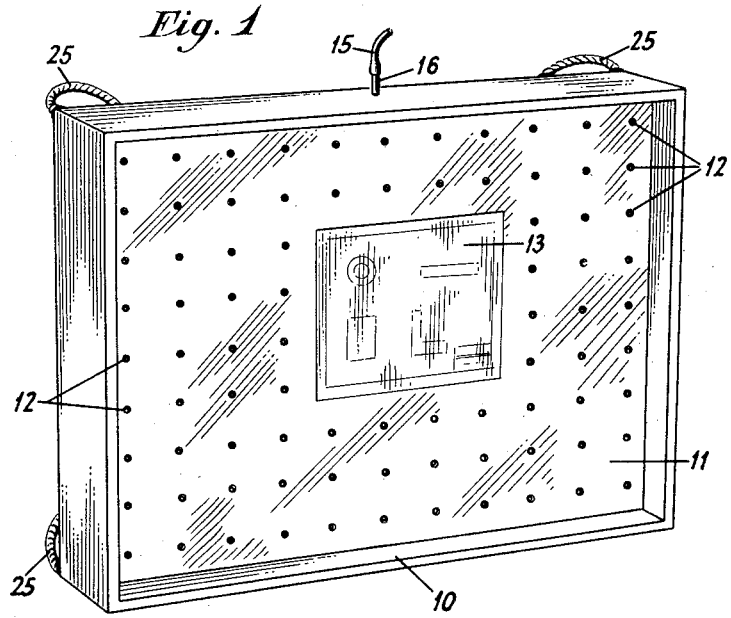
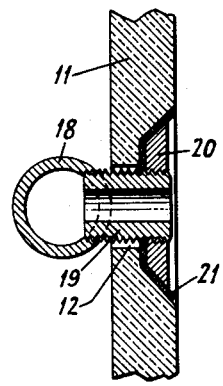
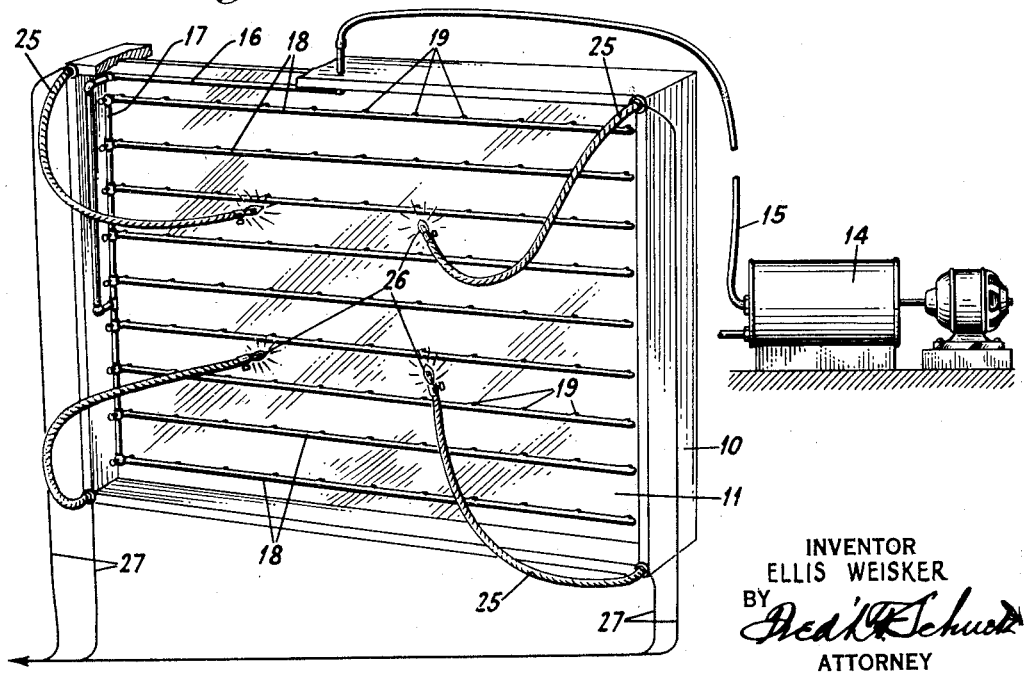
INVENTOR
ELLIS WEISKER
BY
ATTORNEY July 7, 1931.  E. WEISKER  1,813,690
PHOTOGRAPHIC APPARATUS
Filed Oct. 6, 1927  2 Sheets-Sheet 2
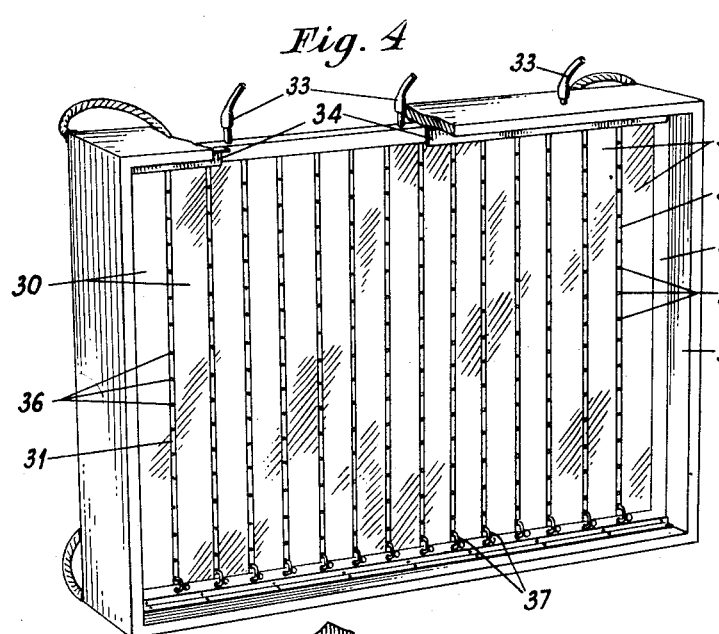
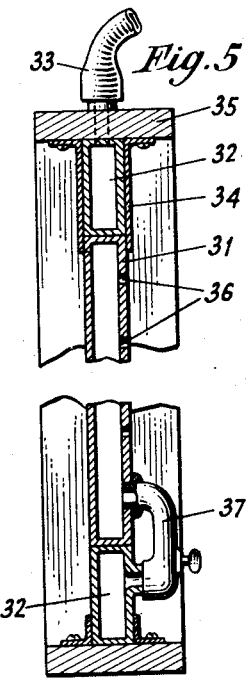
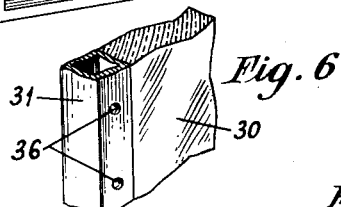
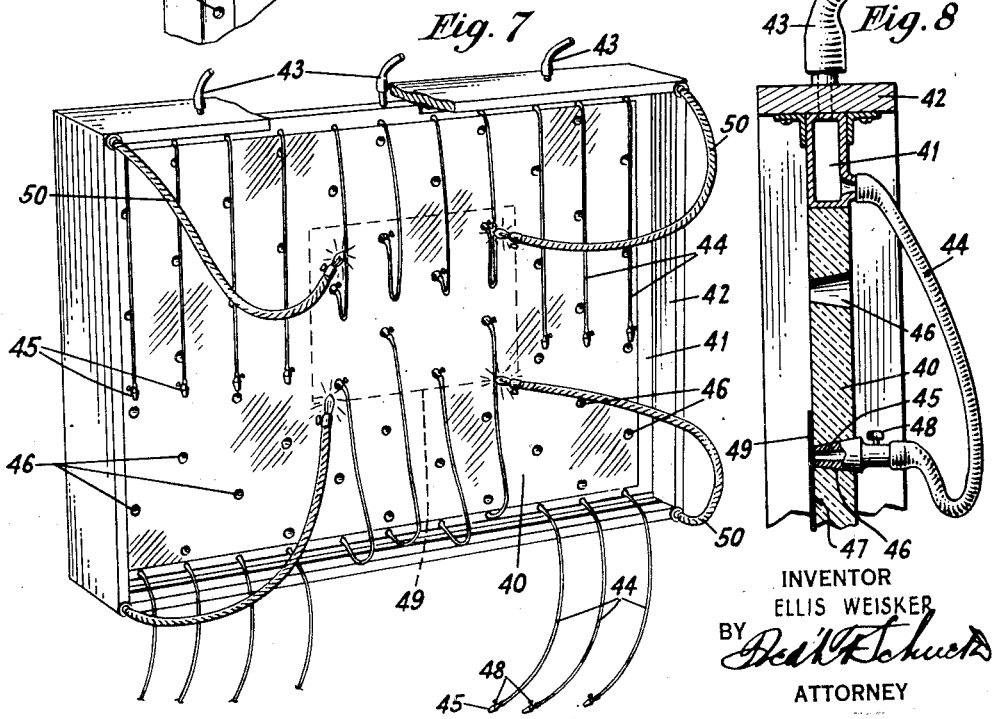
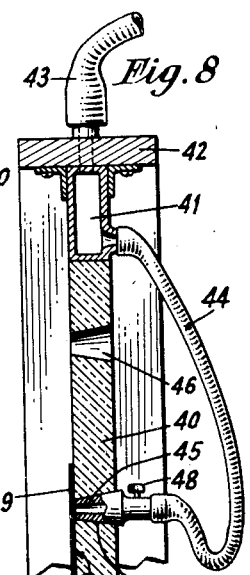
INVENTOR
ELLIS WEISKER
BY
ATTORNEY Patented July 7, 1931

1,813,690

UNITED STATES PATENT OFFICE

ELLIS WEISKER, OF NEW YORK, N. Y.

PHOTOGRAPHIC APPARATUS

Application filed October 6, 1927. Serial No. 224,289.

The invention relates to photographic apparatus, more particularly as utilized in enlargement work and also of the type employed in so-called "photostatic" work where a reproduction of copy is made directly upon a sensitized paper or other more or less flexible material or film. It has been the general practice in the making of enlargements and photostats to first properly focus the camera by viewing the image on a ground glass or the like and then replace the ground glass by a box or frame carrying sensitized material disposed in the focal plane of said glass.

It is the object of the present invention to combine the focusing and sensitized material retaining elements, making thereby unnecessary the insertion and removal of a ground glass or like member as well as the swinging or moving of sensitized material back into place, or the use of a plateholder or the like therefor. To this end, a novel type of vacuum holder for the sensitized material is employed, the same serving also as a focusing ground glass and whereby a sheet of sensitized paper or film may be held perfectly flat in the desired position after a sharp focus has been attained, said sensitized material thus applied then adhering and being maintained substantially in the plane of sharp focus.

The invention has for its object, also, the construction of a focusing screen of this character wherein the ground glass portion upon which an image is to be focused is not exposed to the more or less appreciable pressure resulting, in the usual apparatus of this type, from the applied vacuum. By the novel expedient hereinafter more fully set forth and wherein the sensitized material is directly borne by substantial suction providing members rather than a fragile glass element, breakage of the ground glass is obviated, and focusing screens of extremely large dimensions are possible. A further object of the invention resides in means to readily fix the desired position on the focusing screen, or outline of previously focused image, for locating properly the sheet of sensitized material.

The nature of the invention, however, will best be understood when described in connection with the accompanying drawings, in which:

Fig. 1 is a perspective view of the novel focusing screen showing a piece of sensitized material adhering thereto.

Fig. 2 is a rear view, in perspective, of the focusing screen; and shows also the vacuum producing apparatus associated therewith.

Fig. 3 is an enlarged fragmentary vertical section through the ground glass screen and illustrates the means of providing suction therethrough and manner of securing said means to the glass.

Fig. 4 is a perspective view of a modified form of focusing screen.

Fig. 5 is a detail vertical section through the same.

Fig. 6 is a fragmentary sectional view in perspective of a portion of suction tubing and the associated focusing glass.

Fig. 7 is a rear view, in perspective, illustrating a further modification; and Fig. 8 is a fragmentary vertical section thereof.

Referring to the drawings, more particularly Figs. 1 to 3, 10 designates a frame or rectangular structure which may be supported in any suitable manner for use with an enlarging or photostatic camera (not shown). Within the said frame is secured a translucent member, as the ground glass plate 11, for receiving an image; and the same is adapted to be set relatively to the camera or like apparatus in the plane of sharp focus, in manner well understood in the art.

In accordance with the invention, this focusing plate or screen member is provided with a plurality of perforations 12 which are preferably arranged symmetrically therein, for example, in a series of parallel rows as indicated in Fig. 1. The spacing of these perforations is such that a sensitized sheet, as the sheet 13, Fig. 1, may be securely held to the outer face of the screen at any convenient or predetermined portion by vacuum applied as hereinafter set forth.

This vacuum may be obtained from a motor-driven vacuum pump 14, Fig. 2, through the hose connection 15; but it is not applied in the manner heretofore practiced. As shown, the hose 15 connects through a pipe 16 with a header 17 located, for example, at the side of the frame, which header in turn supports a plurality of branches 18 extending laterally over the back of the screen and spaced far enough apart so as not to interfere with the focusing operation prior to the application of the sensitized material to the front of this screen. Each branch, moreover, has a small extension or short length of pipe 19 screwed therein and extending therefrom at right angles into the corresponding perforations 12 of the ground glass or screen member 11. The outer ends of these extensions are arranged to lie substantially flush with the outer face and ground glass surface of the screen 11, that is to say, substantially in the plane of sharp focus, so that when vacuum is applied to a sheet of sensitized material, as the sheet 13, placed over the various outlets said sheet will be securely held in position on the glass focusing screen in the plane of sharp focus.

To secure conveniently these said extensions to the glass through said perforations, the latter may be counterbored, as indicated, and a nut 20 fitted over the outer threaded ends of the extensions to lock said screen member between a nut and a corresponding branch 18 of the extension, a washer 21 preferably being interposed to obviate cracking the glass in taking up on the nut.

As the operation of applying the sensitized medium to the screen is conducted in a more or less darkened room or in subdued light, it has been found convenient to provide means to fix or outline the focused field portion of the image so that the sensitized sheet subsequent to the focusing operation may be located with more or less accuracy on the desired and previously determined portion of the screen. To this end, there are attached, for example, at the four rear corners of the frame 10 flexible armored cable conductors 25 of more or less stiffness and carrying at their ends suitable electric lamps 26. These lamps are colored as by a suitable lamp lacquer to provide a non-actinic light and are movable over the back of the screen to various positions corresponding to the field of the focused image. Thereby, when the focusing operation has been completed and the screen is ready to receive the sensitized material, the proper location for the same is readily determined by viewing the position of the lights which are visible through said screen, the same having been located, for example, at the points corresponding to the four corners of the image. Power for illuminating the said lamps 26 may be obtained from any suitable source (not shown) through the conductors 27 which connect with the different flexible cable conductors 25.

It will be understood, of course, that the novel focusing screen may serve also as a copy carrying member or holder for copy to be photographed.

For very large work, it is preferred to construct the screen as shown more particularly in Figs. 4-6 of the drawings, the glass portion thereof being provided in the form of a plurality of vertically disposed and removable panels 30 with intermediate tubular elements 31. These tubes and panels are surrounded by a tubular frame, as the rectangular frame 32, to which suction connections 33 are made at various points, as indicated; and the said panels and tubes may be held in position by cleats 34 and secured to the outer enclosing frame 35 of the screen. On the one side, at least, and representing the focal plane of a focused image, the corresponding faces of the intermediate tubes 31 lie flush with the ground glass surface and are, furthermore, provided with a plurality of vertically disposed openings 36 from the interior of a tube to its said face. Provision is made, also, for establishing suction in the individual tubes 31 through suitable valved connections 37, for example, between the lower portion of the frame 32 and an individual tube. By this expedient, it will be necessary to supply suction merely to the particular tubes corresponding to the panels necessary to retain the sensitized material of desired size; and, furthermore, only glass panels of moderate dimensions are employed and the same are not required to be perforated as in the embodiment hereinbefore described.

A further modification in the construction of the type of perforated focusing glass, of the nature set forth in Figs. 1-3, and tending also to conserve the suction, is indicated in Figs. 7 and 8 of the drawings. To this end, an embodiment of the invention is illustrated wherein a perforated plate 40 is mounted within a tubular surrounding frame 41 which in turn is secured to the outer enclosing frame 42, the said frame 41 being provided with vacuum connections 43 similarly to the construction indicated in Figs. 4 and 5.

Instead of providing for permanently located suction elements, there is arranged, for example, from the top and bottom of said tubular frame 41 a plurality of flexible tubes 44 of sufficient length to extend more or less over the back of the perforated plate 40. These tubes are designed to plug into selected perforations and to this end have at their respective outer ends tapered nozzles or heads 45 which may be inserted into the perforations 46 distributed over the plate, said perforations being correspondingly tapered so that when a nozzle is inserted therein it will be held therein and extend substantially flush with the outer face 47 of the plate 40. The connections 44, or, preferably, the nozzles 45, are provided with suitable valves or controlling means 48 for establishing a suction at the surface 47, the focusing screen then being operated, substantially in the manner shown in the construction of Figs. 1–3, to hold the desired sheet 49 of sensitized material to the surface 47. It will be observed that merely a sufficient number of the connections 44 to correspond to the field need be "plugged in" and the corresponding controlling means 48 thereof opened to cause the sensitized material to adhere to the surface 47 after the screen has been properly focused, the remaining connections being inactive and the suction consequently conserved. Field outlining means 50 similar to those heretofore described may also be utilized to assist in determining the proper location for the sensitized sheet 49.

I claim:

1. A focusing member, comprising a perforated translucent portion, and vacuum means associated therewith operating substantially in the focal plane of the said translucent portion to cause sensitized photographic material to be held thereto, and embodying individual vacuum elements entering from one face a said perforation and terminating substantially flush with the surface of the opposite face.

2. A focusing member, comprising a translucent portion, and vacuum means associated therewith operating substantially in the focal plane of the said translucent portion to cause sensitized photographic material to be held thereto, and a plurality of illuminated means movable over the back of said translucent portion to outline a selected portion thereof.

3. A focusing member, comprising a translucent portion, and vacuum means associated therewith operating substantially in the focal plane of the said translucent portion to cause sensitized photographic material to be held thereto, flexible cable members secured to the focusing member, electric lamps carried at the free ends of said cables and movable over the rear of the focusing member, said cables being of sufficient stiffness to maintain the position of the said lamps.

4. A vacuum holding member for flexible material, comprising a member having a plurality of perforations, and vacuum providing members adapted to extend through the respective perforations and terminating substantially in the plane of the one face of said perforated member.

5. A focusing frame, comprising a ground glass having a plurality of perforations, and vacuum providing members extending through the respective perforations and terminating substantially in the plane of the ground face of said ground glass to retain thereon a flexible sensitized medium substantially in the plane of sharp focus.

6. A focusing frame comprising a casing, a glass mounted therein having a plurality of perforations and a ground face, a header along one side of the frame at the rear of said glass, branches extending laterally therefrom over the back of the glass and appreciably displaced from one another, extensions from said branches through the perforations of the glass and terminating substantially in the plane of its ground face, and a vacuum connection to said header.

7. A focusing frame comprising a casing, a glass mounted therein having a plurality of perforations and a ground glass face, a header along one side of the frame at the rear of said glass, branches extending laterally therefrom over the back of the glass and appreciably displaced from one another, extensions from said branches through the perforations of the glass and terminating substantially in the plane of its ground face and threaded at the outer end, a nut working over said threaded outer end of an extension to lock the glass plate to the branches, and a vacuum connection to said header.

8. A focusing frame comprising a casing, a glass mounted therein having a plurality of perforations and a ground face, a header along one side of the frame at the rear of said glass, branches extending laterally therefrom over the back of the glass and appreciably displaced from one another, extensions from said branches through the perforations of the glass and terminating substantially in the plane of its ground face, a vacuum connection to said header, flexible cable members secured to the rear corners of the casing, lamps carried at the free ends of said cables and movable over the rear of the glass, said cables being of sufficient stiffness to maintain the position of the lamps, and means to supply electricity to said lamps for effecting illumination of the same.

In testimony whereof I affix my signature.

ELLIS WEISKER.